Figure 1:
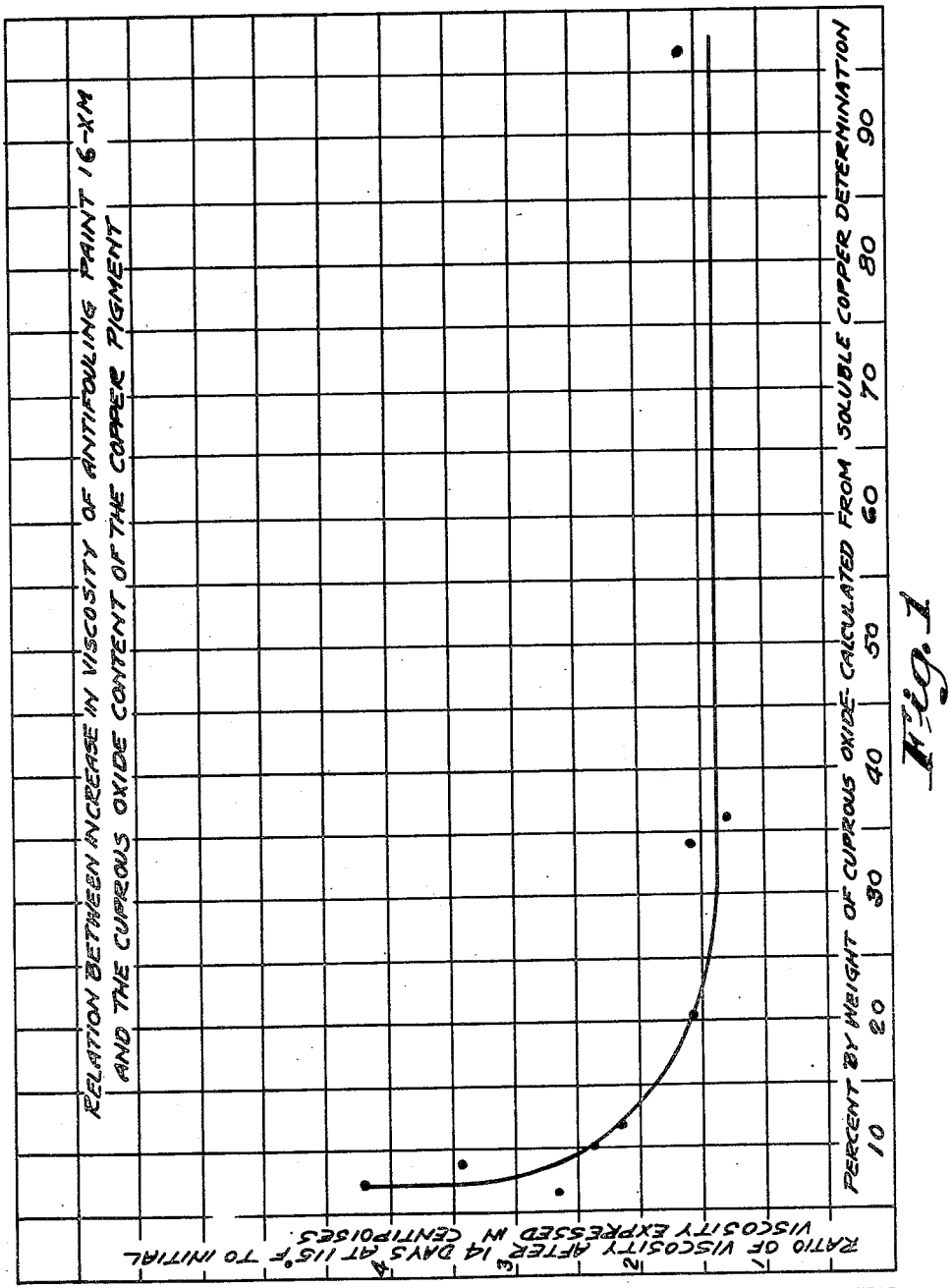

Patented July 11, 1950

2,514,868

UNITED STATES PATENT OFFICE 2,514,868

ANTIFOULING COATING AND PIGMENT

Dean S. Hubbell, Sharpsburgh, Pa., assignor to H. H. Robertson Company, Pittsburgh, Pa., a corporation of Pennsylvania Continuation of application Serial No. 602,397, June 29, 1945. This application April 23, 1948, Serial No. 22,855

1 Claim. (Cl. 260—738)

This invention relates to an antifouling coating, and particularly an antifouling paint, and to a novel cupreous pigment for use therein.

In general, the object of the invention is to produce a novel and superior antifouling composition, and particularly a novel and highly efficient antifouling paint which is particularly useful for application to ships' bottoms, and other marine installations, to inhibit marine growth and the fouling thereof by accumulation of plant and animal growths.

Both metallic copper in powdered form and also cuprous oxide have been employed as antifouling pigments in antifouling paints now on the market, and these paints have been used for application to the hulls and bottoms of ships to inhibit marine growth and the fouling of the bottom by accumulations of plant and animal growths.

The present invention contemplates a novel antifouling coating and preferably a novel antifouling paint, particularly adapted for application to ships' bottoms and other installations to inhibit marine growth and to prevent fouling by barnacles and the like. The novel paint or coating composition embodies a novel and highly efficient antifouling cupreous pigment which is produced from cement copper or precipitated copper as produced by the mines and refineries. When the novel paint or coating composition is applied to the ship's bottom and exposed to the action of the sea water, soluble copper salts are produced more rapidly than with prior antifouling paints now on the market, because of the peculiar composition of the novel cupreous pigment, as will be described.

Cement copper or copper precipitate as produced at the refineries comprises a brownish red sludge, wherein the copper is present in the form of a peculiar crystalline form of copper particle dendritic in nature and capable of being easily crushed when subjected to impact as by passing through one of several types of hammermills, jet pulverizers and ball mills. The commercial cement and precipitated copper in the condition obtainable from the refineries contains impurities including compounds of iron, aluminum and silica. Along with such impurities commercial cement copper contains cuprous oxide in varying amounts from a small amount up to 40% and in some instances more, depending upon the method employed in precipitating the material at the mines. For example, cement copper obtained from Western mines has averaged about 18% cuprous oxide, whereas a cement copper obtained from Eastern sources averaged in the neighborhood of 40 to 60% of cuprous oxide.

When such copper sludge was air dried according to prior practice the product blackened, resulting in a product having a high cupric oxide content, and such a product has been regarded as unsatisfactory for the production of antifouling paints. Freshly precipitated copper has also been dried in a reducing atmosphere to produce a bright, oxide free cupreous powder which is relatively unstable against oxidation in the air, tending to blacken quickly and accordingly has not been satisfactory for the production of antifouling paints.

In order to produce the present stable in the air cupreous pigment, the cement or precipitated copper sludge preferably in its unrefined condition and in any event without being subjected to chemical treatment which would effect the removal of its cuprous oxide content, is shipped from the refinery in a damp state and in such a manner as to minimize further oxidation of the copper and so that the cement or precipitated copper when received is substantially free from cupric oxide. This may be accomplished in practice by shipping the damp material in a tight container or by shipping it in a bulk mass in which the moisture content is so high that all interstices between the particles are filled with water and the air is consequently excluded. Experience has shown that a minimum amount of water of from 22 to 27% will accomplish this result. The damp and incompletely oxidized cement copper or copper precipitate as thus received, may be subjected to further processing as follows: The wet sludge is subjected to treatment to remove the water therefrom as rapidly as possible. Heretofore commercial cement or precipitated coppers have been regarded as unstable. Damp copper oxidizes with great rapidity when exposed to the air, especially when heated and oftentimes at a rate approaching spontaneous combustion.

Accordingly, the removal of moisture is preferably effected as rapidly as possible in order to shorten the interval during which the drying copper particles are exposed to severe oxidizing conditions. This may be accomplished in any of several types of drying equipment in which moisture is rapidly evaporated and swept away from relatively thin layers of the powder at temperatures not greatly in excess of the boiling point of water. For example direct or indirect fired rotary driers; and heated surfaces over which relatively thin layers of the powder are moved; conveyors that move the powder in relatively thin layers while it is heated by radiation or by hot gases have been found satisfactory.

Satisfactory results have also been obtained by subjecting the material to drying during the crushing operation providing the moisture content is not exceedingly high, employing hot products of combustion as the circulating medium in a commercially available high speed unit pulverizer of the impact type, which may be equipped with air separation and with an air drying system for evaporating moisture from materials during the grinding process, additional air being introduced into the mill and circulated during the operation.

In practice it has been found to be desirable to accomplish the drying in two steps, one immediately following the other. The damp powder is first given a preliminary drying down to approximately 10% of water by one of the driers mentioned above, then transferred immediately to the impact or crushing mill where the remainder of the moisture is most completely removed, preferably to 0.2–0.4% during grinding by the hot gaseous circulating medium. Dust in the primary drier is avoided by discharging the product at a moisture content that is above the point where dust is produced. This partially dried powder must be immediately transferred to the impact mill and given its final drying to remove the moisture as completely as possible, as even one or two per cent of moisture causes oxidation of the copper to the cupric state, resulting in a blackened and commercially unsatisfactory product.

The next step in the process of producing the present pigment comprises subjecting to pulverization the cement copper with its copper content comprising friable copper dendrites and a varying but substantial content of cuprous oxide and containing very little if any cupric oxide. The pulverization may be accomplished by passing the material through an impact mill, such as a hammermill or a jet pulverizer, and through which air is preferably circulated along with hot products of combustion. The pulverizing action upon the cement copper not only crushes it to extreme fineness, wherein the particle size is reduced to a few microns but also produces the most unexpected result of imparting to the material the ability to resist further oxidation when exposed to atmospheric conditions. In order to discover the underlying reasons for the high reactivity of the present finely divided cuprous material and its remarkable air stability, extended research was carried on including chemical analysis of the cuprous powder product as above described. The results of such analyses disclosed that the cuprous oxide content was not appreciably increased during the passage of the material through the mill and further that additional passes through the mill did not effect any further oxidation of the copper to cuprous oxide. X-ray studies and also inspection of polished surfaces cut through the particles and viewed with reflected light at 1000 diameters demonstrated that the cuprous powder comprises copper particles having thin surface films of cuprous oxide thereon, which appear to serve as protective films therefor. Among the film covered copper particles occasional small grains of oxidized copper ($Cu_2O$) were disclosed which obviously afforded no protection for the copper particles. Examination of cuprous products produced from cement copper from different sources and which contained widely varying amounts of cuprous oxide, as for example variations from 18 to 42% cuprous oxide, demonstrated that the surface film was of substantially the same thickness irrespective of the original cuprous oxide content. The original granular form of the cuprous oxide in the unprocessed cement copper indicates its unprotective nature and explains the reason why the unprocessed cement copper readily oxidizes to cupric oxide.

My research has indicated that the novel air stable and high reactive cupreous powder may be produced from cement or precipitated copper having a widely varying cuprous oxide content, and the lower limit of cuprous oxide content required may be stated as being sufficient to be discernible by metallographic methods and to be identified by X-ray diffraction. When at least such an amount of cuprous oxide is present it has been found that the present process results in the production of a cupreous powder wherein the fine copper particles are coated with a thin protective film of cuprous oxide.

In explanation of the production of the air stable and highly reactive cupreous powder as deduced from the foregoing evidence, it will be observed that, as above stated, the unrefined cement copper, constituting the raw material which is fed to the mill, contains metallic copper particles of varying sizes in the form of friable copper dendrites and that the cuprous oxide, which may vary widely in amount as above set forth, exists in the form of solid masses or grains of varying size and which are distributed throughout the cement copper. Presumably some cuprous oxide exists on the surface of the copper particles but probably in the form of a loosely adhering scale or excrescence and not in the form of continuous film covering the copper particles. When this cement copper is subjected to the hammering action of the mill, these friable particles are broken apart and the operation is continued until the average particle diameter of the ground or crushed product is a few microns, and in commercial practice a fineness of the order of two microns is easily obtained. The new metallic surfaces produced by the crushing and subdivision of the particles in the mill are produced at a time when the particle is hot as a result of the impact and these surfaces are swept by an atmosphere that is at least somewhat oxidizing in nature. As a result, it is believed that a cuprous oxide film is formed on the surfaces of the individual particles and this fact is borne out by metallographic studies. Furthermore, experience justifies the belief that the cuprous oxide film produced under these conditions is continuous and serves to protect the metallic copper particles from further oxidation. For example, it is known that high temperature films of oxide on iron are more protective against further oxidation than low temperature films and furthermore that films put on by shot peening are quite resistant to further oxidation. Presumably this peening does several things—it heats the surface momentarily due to the impact and it also does some work on the film produced, probably spreading it around, compacting it and closing up the discontinuities. The action that the cuprous particles receive can be pictured as very similar to this peening for the hammermill or jet pulverizer accomplish much of their result by causing particles to strike each other. Thus the particles peen each other, producing on each other a film that is continuous and serves as a barrier to further oxidation. This protective film is very thin, as shown by the metallographs, but there are many examples of extremely thin protective films on metal surfaces, i. e. aluminum. Here, then, is an explanation of the fact that while the copper powder is remarkably stable in air, it is highly reactive in certain solutions. In these solutions the thin protective coating is removed and an enormous metallic surface is exposed. The solution rate of this exposed particle may be accelerated by the fact that metallic copper and cuprous oxide lie in close proximity and thus contribute to galvanic corrosion by creating a large number of small couples.

As indicating the particle size of the cupreous pigment produced by the impaction methods above described, the following results of comparative tests show a reduction in particle size with a resulting increase in surface area of the particles.

FEED (COPPER PRECIPITATE)

|  | #1 | #2 |
| --- | --- | --- |
| Less than 15 microns_____per cent__ | 95.7 | 94.0 |
| Less than 10 microns_____do____ | 91.8 | 91.6 |
| 7.5 microns_____do____ | 84.8 | 81.3 |
| 5 microns_____do____ | 58.5 | 60.0 |
| 2.5 microns_____do____ | 8.5 | 12.9 |
| Surface area sq. cm./gm_____ | 2,160 | 2,161 |

PRODUCT (OF THE MILL)

Grind #1

| | |
| --- | --- |
| Less than 20 microns_____per cent__ | 99.5 |
| 15 microns_____do____ | 97.7 |
| 10 microns_____do____ | 95.8 |
| 7.5 microns_____do____ | 92.7 |
| 5 microns_____do____ | 78.2 |
| 2.5 microns_____do____ | 24.3 |
| Surface area sq. cm./gm_____ | 3140 |

Grind #2

| | |
| --- | --- |
| Less than 20 microns_____per cent__ | 99.5 |
| 15 microns | |
| 10 microns_____per cent__ | 95.3 |
| 7.5 microns_____do____ | 92.0 |
| 5 microns_____do____ | 80.0 |
| 3.5 microns_____do____ | 50.0 |
| 2.5 microns_____do____ | 25.0 |
| 1.25 microns_____do____ | 2.0 |
| Surface area sq. cm./gm_____ | 3140 |

When the copper precipitate was passed through a mill of the jet pulverizer type the following results were obtained:

| | |
| --- | --- |
| Less than 20 microns_____per cent__ | 98 |
| 15 microns_____do____ | 97 |
| 10 microns_____do____ | 93.5 |
| 7.5 microns_____do____ | 89.3 |
| 5 microns_____do____ | 81.0 |
| 3.5 microns_____do____ | 66.1 |
| 2.5 microns_____do____ | 44.5 |
| 1.5 microns_____do____ | 10.0 |
| 1.25 microns_____do____ | 5.4 |
| Surface area sq. cm./gm_____ | 3545 |

The density of the present cupreous pigment as measured and calculated is as follows:

From Western Precipitate:
    Calculated composite specific gravity___ 7.30
Measured composite specific gravity_____ 7.37
From Pyrites Precipitate:
    Calculated composite specific gravity___ 6.45
Measured composite specific gravity_____ 6.37

The present antifouling pigment may be used with advantage in known formulations of antifouling paints, the principal requisite being that the vehicle permit the passage of the sea water into contact with the copper particles. In other words, it is desirable that the vehicle be such as to produce a film which is not too waterproof.

A typical formulation is as follows:

| | Per cent |
| --- | --- |
| Antifouling pigment_____ | 42.2 |
| Rosin _____ | 21.1 |
| Hercolyn (hydrogenated methyl abietate)__ | 10.6 |
| Chlorinated rubber_____ | 1.4 |
| Diatomaceous silica_____ | 7.1 |
| Naphtha _____ | 17.6 |

Other examples of formulations of antifouling paints are as follows:

EXAMPLE 1

| | Per cent |
| --- | --- |
| The present antifouling pigment_____ | 45.0 |
| Vinylite XYNC (polyvinyl butyral)_____ | 3.5 |
| Rosin (water white grade)_____ | 10.5 |
| Solvesso #2 (hydrogenated petroleum naphtha) _____ | 16.0 |
| Synasol (denatured alcohol)_____ | 25.0 |
| | 100.0 |

EXAMPLE 2

| | Per cent |
| --- | --- |
| The present antifouling pigment_____ | 61.5 |
| Rosin (water white grade)_____ | 15.4 |
| Synasol (denatured alcohol)_____ | 23.1 |
| | 100.0 |

EXAMPLE 3

| | Pounds |
| --- | --- |
| Zinc oxide_____ | 210 |
| Indian red_____ | 80 |
| Magnesium silicate, Type 1_____ | 80 |
| The present antifouling pigment_____ | 425 |
| Mercuric oxide_____ | 21 |
| Rosin, Type 1, water white_____ | 265 |
| Pine oil_____ | 42 |
| Coal tar (based on 80% non-volatile content) | 80 |
| High flash naphtha_____ | 135 |
| Petroleum spirits, Grade 1_____ | 135 |

EXAMPLE 4

| | Per cent |
| --- | --- |
| Rosin (water white)_____ | 22.4 |
| Hydrogenated methyl abietate_____ | 11.2 |
| The present antifouling pigment_____ | 44.8 |
| Diatomaceous earth_____ | 7.5 |
| Naphtha _____ | 6.6 |
| Petroleum spirits_____ | 7.5 |

EXAMPLE 5

| | Per cent |
| --- | --- |
| Rosin (water white)_____ | 21.1 |
| Hydrogenated methyl abietate_____ | 10.6 |
| Chlorinated rubber (125 cps.)_____ | 1.4 |
| Diatomaceous earth_____ | 7.1 |
| Coal tar naphtha_____ | 17.6 |
| The present antifouling pigment_____ | 42.2 |

EXAMPLE 6

| | Per cent |
| --- | --- |
| Calcium resinate_____ | 10.6 |
| Hydrogenated methyl abietate_____ | 10.6 |
| Rosin (water white)_____ | 10.6 |
| Chlorinated rubber (125 cps.)_____ | 1.4 |
| Diatomaceous earth_____ | 7.1 |
| Coal tar naphtha_____ | 17.6 |
| The present antifouling pigment_____ | 42.6 |

EXAMPLE 7

| | Per cent |
|---|---|
| Copper resinate | 21.1 |
| Hydrogenated methyl abietate | 10.6 |
| Chlorinated rubber (125 cps.) | 11.4 |
| Diatomaceous earth | 7.1 |
| Coal tar naphtha | 17.6 |
| The present antifouling pigment | 42.6 |

EXAMPLE 8

| | Per cent |
|---|---|
| Rosin (water white) | 21.1 |
| Fish oil | 10.6 |
| Chlorinated rubber (125 cps.) | 1.4 |
| Diatomaceous earth | 7.1 |
| Coal tar naphtha | 17.6 |
| The present antifouling pigment | 42.6 |

EXAMPLE 9

| | Per cent |
|---|---|
| The present antifouling pigment | 45.0 |
| Vinylite AYAF (polyvinyl acetate) | 3.5 |
| Rosin (water white) | 10.5 |
| Solvesso | 16.0 |
| Synasol | 25.0 |

EXAMPLE 10

| | Per cent |
|---|---|
| The present antifouling pigment | 33 |
| China clay | 27 |
| Varnish (8-gallon linseed, tung, cumarone) 40–50% solids | 40 |

EXAMPLE 11

Pigment composed as follows:
- Zinc oxide, 26.6%
- Indian red, 10.0%
- Talc, 10.0%
- The present antifouling pigment, 53.4% per cent 54.9

Vehicle composed as follows:
- Rosin, 40.5%
- Pine oil, 6.1%
- Coal tar, 12.2%
- Thinner, 41.2% per cent 45.1

EXAMPLE 12

Pigment:
  The present antifouling pigment
Vehicle:
  6-gallon cumarone indene p-phenylphenol-formaldehyde

EXAMPLE 13

| | Per cent |
|---|---|
| Pigment | 43.1 |
| Oil, resin mixture | 30.2 |
| Shale spirit | 26.7 |

The oil and resin mixture contains 8% free rosin. The resinates consists of equal parts of zinc and copper resinate.

Pigment composition

| | Per cent |
|---|---|
| Ferric oxide | 22.5 |
| The present anti-fouling pigment | 34.2 |
| Copper sulfocyanide | 14.4 |
| Mercury oxide | 15.1 |
| White arsenic | 3.0 |
| Lime (CaO) | 2.0 |
| Zinc oxide | 1.6 |
| Sodium sulfate | 1.9 |
| Insoluble matter | 1.6 |
| Moisture and alkalies | 2.1 |

Cuprous oxide has proved to be more desirable than metallic copper for general use as an antifouling pigment in antifouling paints because of the tendency of the metallic copper to hasten the corrosion of the steel plates when the paint is applied over steel, this galvanic corrosive effect being produced upon exposure to the sea water.

The present cupreous pigment and the antifouling paint embodying the same exhibits a minimum corrosive effect when applied to the steel hulls of ships and has been generally and commercially accepted as being as desirable in this respect as cuprous oxide.

The present cupreous pigment has however been definitely found to possess a much higher leach rate in sea water than cuprous oxide and consequently the anti-fouling paint embodying the same is more efficient in inhibiting marine growth than comparable paints embodying cuprous oxide.

Comparative leach rate tests gave the following results:

4-HOUR LEACH RATE DETERMINATIONS

| | Cuprous Oxide, P. P. M. Cu | New Cupreous Pigment, P. P. M. Cu |
|---|---|---|
| Test #1 | 0.4 | 4.0 |
| Test #2 | 0.5 | 2.0 |
| Test #3 | 0.5 | 2.0 |
| Test #4 | 0.4 | 2.0 |

These and other tests establish the fact that the present cupreous pigment has a leach rate substantially greater than cuprous oxide, and experience has shown that its efficiency in inhibiting marine growth is proportionately greater than cuprous oxide. When the present cupreous powder is utilized as the antifouling pigment in an antifouling paint, research has demonstrated that the relationship between the amount of cuprous oxide in the present cupreous powder has an important effect upon the viscosity of the paint into which it is incorporated. All prior copper or copper oxide powders when embodied in antifouling paints appear to develop an undesirable jellying or substantial increase in viscosity after standing. The graph shown in Fig. 1 illustrates the results of research to determine the relation between the increase in viscosity of an antifouling paint embodying the present cupreous powder and the cuprous oxide content of the cupreous powder. Consideration of the graph shows that when the amount of cuprous oxide is decreased to the neighborhood of 10%, the thickening or undesirable increase in viscosity of the paint rises very rapidly. Accordingly, it is preferred that cuprous oxide content of the present cupreous powder for most desirable results as an antifouling pigment should be at least about 10% and preferably slightly more.

As above pointed out, cement or precipitated copper in the condition in which it is produced at the mines or refineries contains substantial impurities particularly iron sulphate and aluminum salts. In accordance with the present process, these impurities are not removed so that the present cupreous copper powder contains substantial but minor amounts of these impurities. These impurities contribute to the stability of the cuprous films which serve to protect the copper particles from undesired oxidation into the cupric state because of the fact that when exposed to moisture these impurities hydrolyze to form an environment which is acidic in nature and which serves to stabilize the protective cuprous oxide film. It has been recognized, as illustrated in United States Letters Patent No. 2,184,-

617, that cuprous oxide is greatly enhanced if it is kept in an acid environment and the presence of the acid-forming salts as iron sulphate and aluminum salts serves, in the present cupreous product, to insure, in the presence of the small amount of moisture, the desired acidic environment. That these salts have the effect of producing the desired acidic environment can be demonstrated by subjecting cement copper or copper precipitate to washing with distilled water until the water in contact with it is neutral. Thereafter if this water is left in contact with the cement copper or copper precipitate, it will be noticed after a lapse of a period of time that the water has become acidic. This appears to be due to the hydrolysis of these salts slowly producing an acidic environment in which cuprous oxide film produced on the individual particles of the present cupreous product is most stable.

This application is a continuation of my copending application Serial No. 602,397, filed June 29, 1945, now abandoned.

Having thus described the invention, what is claimed is:

An antifouling coating composition particularly useful for application to ships' bottoms comprising the following components in substantially the following proportions:

| | Per cent |
|---|---|
| Antifouling pigment | 42.2 |
| Rosin | 21.1 |
| Hercolyn (hydrogenated methyl abietate) | 10.6 |
| Chlorinated rubber | 1.4 |
| Diatomaceous silica | 7.1 |
| Naphtha | 17.6 | said antifouling pigment comprising a finely divided cupreous powder, the major portion of the particles of which are a few microns in size and having as a principal constituent friable metallic copper core particles surrounded by protected surface films of cuprous oxide inhibiting oxidation in the air, said films being relatively thin as compared with the size of the enclosed copper cores, the amount of cuprous oxide on the individual cores being at least sufficient to be identified by present X-ray diffraction methods, said antifouling coating composition being characterized by a leach rate in sea water at least equal to that of cuprous oxide.

DEAN S. HUBBELL.

REFERENCES CITED

The following references are of record in the file of this patent:

UNITED STATES PATENTS

| Number | Name | Date |
|---|---|---|
| 2,225,303 | Iliff et al. | Dec. 17, 1940 |
| 2,420,540 | Hubbell | May 13, 1947 |
| 2,441,945 | Frolich et al. | May 25, 1948 |